United States Patent
Kelly et al.

(10) Patent No.: US 12,314,778 B2
(45) Date of Patent: May 27, 2025

(54) SYSTEMS AND METHODS FOR DATA PROCESSING UNIT AWARE WORKLOAD MIGRATION IN A VIRTUALIZED DATACENTER ENVIRONMENT

(71) Applicant: Dell Products L.P., Round Rock, TX (US)

(72) Inventors: John Kelly, Mallow (IE); Dharmesh M. Patel, Round Rock, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 654 days.

(21) Appl. No.: 17/482,962

(22) Filed: Sep. 23, 2021

(65) Prior Publication Data
US 2023/0091753 A1    Mar. 23, 2023

(51) Int. Cl.
*G06F 9/50* (2006.01)
*G06F 9/455* (2018.01)
*G06F 9/48* (2006.01)

(52) U.S. Cl.
CPC ............ *G06F 9/5088* (2013.01); *G06F 9/455* (2013.01); *G06F 9/45533* (2013.01); *G06F 9/48* (2013.01); *G06F 9/4806* (2013.01); *G06F 9/4843* (2013.01); *G06F 9/485* (2013.01); *G06F 9/4856* (2013.01); *G06F 9/4881* (2013.01); *G06F 9/50* (2013.01); *G06F 9/5027* (2013.01); *G06F 9/505* (2013.01); *G06F 9/5061* (2013.01); *G06F 9/5077* (2013.01); *G06F 9/5083* (2013.01)

(58) Field of Classification Search
CPC .... G06F 9/5077; G06F 3/0647; G06F 3/0689; G06F 2009/4557; G06F 9/5044; G06F 9/505; G06F 9/4856; G06F 9/455; G06F 9/45533; G06F 9/48; G06F 9/4806; G06F 9/4843; G06F 9/485; G06F 9/4881; G06F 9/50; G06F 9/5027; G06F 9/5061; G06F 9/5083; G06F 9/5088
USPC .......................................................... 718/104
See application file for complete search history.

(56) References Cited

U.S. PATENT DOCUMENTS 10,684,888 B1 *  6/2020  Sethuramalingam ........................ G06F 9/45558
11,307,885 B1 *  4/2022  Luciano ................ G06F 9/5088
11,886,926 B1 *  1/2024  Gadalin ................ G06F 9/4856
(Continued)

*Primary Examiner* — Charles M Swift
(74) *Attorney, Agent, or Firm* — Chamberlain, Hrdlicka, White, Williams & Aughtry; Aly Z. Dossa

(57) ABSTRACT

Techniques described herein relate to systems and methods for data processing unit (DPU) workload management. Such methods may include obtaining, by a DPU workload manager, a DPU utilization value for a first node in a device ecosystem; making a first determination, by the DPU workload manager and using the DPU utilization value, that DPU utilization of the first node is above a DPU utilization threshold configured for the first node; identifying, in response to the first determination, a workload executing on the first node as a migration candidate based at least in part on a central processing unit (CPU) utilization value associated with the workload; initiating a migration of the migration candidate to a second node in the device ecosystem; and obtaining, after the migration completes, a second DPU utilization value for the first node to determine whether the second DPU utilization value is below the DPU utilization threshold.

11 Claims, 6 Drawing Sheets

(56) References Cited

U.S. PATENT DOCUMENTS

| | | | |
|---|---|---|---|
| 2009/0228589 A1* | 9/2009 | Korupolu | H04L 67/1097 709/226 |
| 2012/0254414 A1* | 10/2012 | Scarpelli | G06F 11/3495 709/224 |
| 2014/0181834 A1* | 6/2014 | Lim | G06F 9/5088 718/105 |
| 2015/0347183 A1* | 12/2015 | Borthakur | G06F 9/5088 718/105 |
| 2017/0315838 A1* | 11/2017 | Nidugala | H04L 43/0817 |
| 2019/0065281 A1* | 2/2019 | Bernat | G06F 11/3006 |
| 2020/0366733 A1* | 11/2020 | Parvataneni | H04L 67/34 |
| 2022/0046036 A1* | 2/2022 | Bastawala | G06F 11/3006 |
| 2023/0031998 A1* | 2/2023 | Boyapalle | G06F 9/505 |

* cited by examiner

SYSTEMS AND METHODS FOR DATA PROCESSING UNIT AWARE WORKLOAD MIGRATION IN A VIRTUALIZED DATACENTER ENVIRONMENT

BACKGROUND

Computing devices often exist in ecosystems that include any number of devices. Devices in such a device ecosystem may perform a variety of workloads. Often, resources on one node in a device ecosystem are over-utilized, while other nodes in the device ecosystem have resources that are under-utilized (or less utilized). In such scenarios, it may be useful to move at least one of the workloads from a node with over-utilized resources to a different node in the device ecosystem.

SUMMARY

In general, embodiments described herein relate to a method for data processing unit (DPU) workload management. The method may include obtaining, by a DPU workload manager, a DPU utilization value for a first node in a device ecosystem; making a first determination, by the DPU workload manager and using the DPU utilization value, that DPU utilization of the first node is above a DPU utilization threshold configured for the first node; identifying, in response to the first determination, a workload executing on the first node as a migration candidate based at least in part on a central processing unit (CPU) utilization value associated with the workload; initiating a migration of the migration candidate to a second node in the device ecosystem; and obtaining, after the migration completes, a second DPU utilization value for the first node to determine whether the second DPU utilization value is below the DPU utilization threshold.

In general, embodiments described herein relate to a non-transitory computer readable medium that includes computer readable program code, which, when executed by a computer processor enables, the computer processor to perform a method for data processing unit (DPU) workload management. The method may include obtaining, by a DPU workload manager, a DPU utilization value for a first node in a device ecosystem; making a first determination, by the DPU workload manager and using the DPU utilization value, that DPU utilization of the first node is above a DPU utilization threshold configured for the first node; identifying, in response to the first determination, a workload executing on the first node as a migration candidate based at least in part on a central processing unit (CPU) utilization value associated with the workload; initiating a migration of the migration candidate to a second node in the device ecosystem; and obtaining, after the migration completes, a second DPU utilization value for the first node to determine whether the second DPU utilization value is below the DPU utilization threshold.

In general, embodiments described herein relate to a system for data processing unit (DPU) workload management. The system may include a processor comprising circuitry; memory; and a DPU workload manager operatively connected to a plurality of nodes of a device ecosystem, and executing on the processor and using the memory. The DPU workload manager may be configured to obtain a DPU utilization value for a first node of the plurality of nodes; make a first determination, using the DPU utilization value, that DPU utilization of the first node is above a DPU utilization threshold configured for the first node; identify, in response to the first determination, a workload executing on the node as a migration candidate based at least in part on a central processing unit (CPU) utilization value associated with the workload; initiate a migration of the migration candidate to a second node in the device ecosystem; and obtain, after the migration completes, a second DPU utilization value for the first node to determine whether the second DPU utilization value is below the DPU utilization threshold.

Other aspects of the embodiments disclosed herein will be apparent from the following description and the appended claims.

BRIEF DESCRIPTION OF DRAWINGS

Certain embodiments discussed herein will be described with reference to the accompanying drawings. However, the accompanying drawings illustrate only certain aspects or implementations of embodiments described herein by way of example and are not meant to limit the scope of the claims.

DETAILED DESCRIPTION

Figure 1:
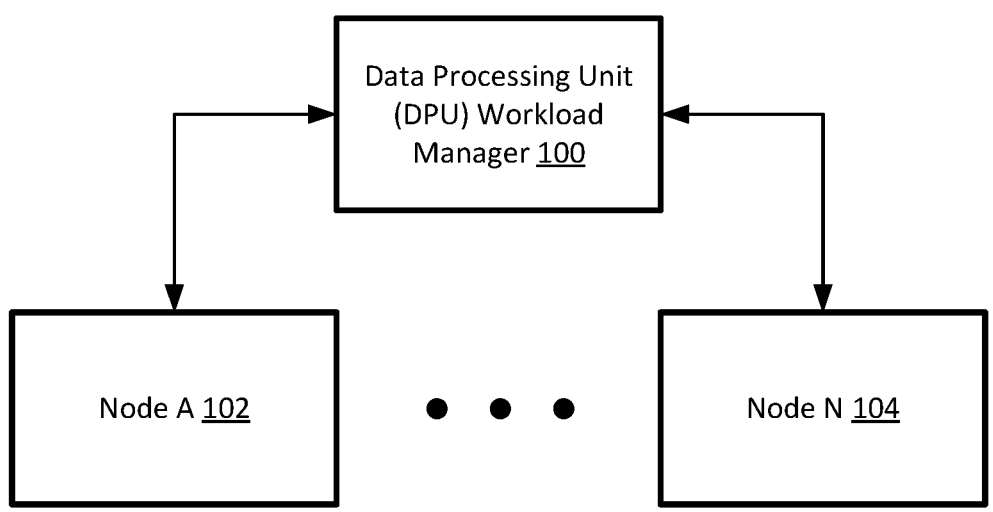
FIG. 1 shows a diagram of a system in accordance with one or more embodiments described herein.

Specific embodiments will now be described with reference to the accompanying figures.

In the below description, numerous details are set forth as examples of embodiments described herein. It will be understood by those skilled in the art (who also have the benefit of this Detailed Description) that one or more embodiments described herein may be practiced without these specific details, and that numerous variations or modifications may be possible without departing from the scope of the embodiments described herein. Certain details known to those of ordinary skill in the art may be omitted to avoid obscuring the description.

In the below description of the figures, any component described with regard to a figure, in various embodiments described herein, may be equivalent to one or more like-named components described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

As used herein, the phrase operatively connected, or operative connection, means that there exists between elements/components/devices a direct or indirect connection that allows the elements to interact with one another in some way. For example, the phrase 'operatively connected' may refer to any direct (e.g., wired directly between two devices or components) or indirect (e.g., wired and/or wireless connections between any number of devices or components connecting the operatively connected devices) connection. Thus, any path through which information may travel may be considered an operative connection.

In general, embodiments described herein relate to methods, systems, and non-transitory computer readable mediums storing instructions for data processing unit (DPU) aware workload management in accordance with one or more embodiments described herein.

In one or more embodiments, a DPU is a set of resources of a computing device separate from a central processing unit (CPU) or accelerator processor (e.g., graphics processing unit) traditionally used for executing operations. In one or more embodiments, a DPU may include, but is not limited to, one or more processors, one or more network interfaces, and any amount of programmable logic devices. In one or more embodiments, a DPU is implemented as a system on a chip. In one or more embodiments, a DPU performs any type or quantity of tasks, which may, as examples, be related to data movement, data management, security, software defined security, software defined networking, infrastructure management, etc. Such activities by the DPU may be performed in relation to any executing workload on a node (e.g., virtual machines, containers, etc.) and/or on behalf of the node itself, or any portion thereof. As an example, a DPU may be all or any portion of a Smart Network Interface Controller (SmartNIC).

In one or more embodiments, a given node in a device ecosystem may be configured with a DPU utilization threshold. In one or more embodiments, DPU utilization is a percentage quantity of resources of a DPU being used at a certain point in time (e.g., when a measurement is made of DPU utilization). In one or more embodiments, DPU utilization on a node exceeding the DPU utilization threshold serves as a trigger to perform a workload migration action in order to reduce the DPU utilization of the node. In one or more embodiments, a workload migration action includes identifying one or more workloads to migrate to a different node for continued execution, thereby reducing the DPU utilization of the node from which the one or more workloads were migrated, such that the DPU utilization of the node falls below the DPU utilization threshold. In one or more embodiments, migration of workloads based on DPU utilization may serve to load balance, at least in part, DPU utilization among nodes in a device ecosystem.

However, in the state of the art, it may be difficult to ascertain which workloads to identify and migrate in order to reduce DPU utilization on a node, as it is often not clear which workloads are contributing to the DPU utilization, or how much of a contribution is made by a given workload to the DPU utilization of a node. This differs, for example, from CPU utilization of a node, where additional information about workload processes being executed by the CPU is more readily available and identifiable.

Therefore, one or more embodiments described herein include techniques for identifying migration candidates when a DPU utilization threshold has been breached on a given node in a device ecosystem. In one or more embodiments, identifying a migration candidate includes using one or more CPU utilization values associated with workloads executing on the node.

In one or more embodiments, an assumption is made that workloads that contribute more to node CPU utilization also contribute more to node DPU utilization. Therefore, node CPU utilization may be obtained, along with workload process information that may be used to identify the contribution of a given workload to the node CPU utilization. In one or more embodiments, the workload contributing the most to the node CPU utilization is identified as a migration candidate.

Additionally or alternatively, in one or more embodiments, a correlation is determined between the CPU utilization of a given workload and the DPU utilization of the node. In one or more embodiments, to calculate such a correlation, DPU utilization over time may be obtained as one information set, and the CPU utilization of a given workload over time may be obtained as another information set. In one or more embodiments, the two information sets may be used to calculate a correlation coefficient between the two information sets. Any scheme for calculating a correlation coefficient may be used without departing from the scope of embodiments described herein. As an example, a Pearson correlation coefficient may be calculated, which represents the linear correlation between two sets of data. In one or more embodiments, a correlation coefficient is calculated for each of the various workloads on the node, and ranked based on the value of the correlation coefficient. In one or more embodiments, a higher correlation coefficient results in a higher ranking in the ranking of workloads. In one or more embodiments, the correlation coefficient represents the calculated correlation between the CPU utilization of a given workload, and the DPU utilization of the node as a whole. In one or more embodiments, the node having a correlation coefficient causing the workload to have the highest ranking among the workloads of the node is selected as a migration candidate.

In one or more embodiments, once a migration candidate has been selected (e.g., using either of the two methods described above), a migration of the workload is initiated.

For example, a request may be made to a virtual machine manager (VMM) to migrate a virtual machine (VM) having the highest calculated correlation coefficient from among the VMs executing on the node to another node in the device ecosystem. In one or more embodiments, once the migration is complete, the node DPU utilization is measured again. In one or more embodiments, if the DPU utilization for the node remains above the DPU utilization threshold, the above-described process may be repeated, thereby migrating more workloads, until the DPU utilization for the node is below the configured DPU utilization threshold for the node.

In one or more embodiments, the destination node for the workload to be migrated is selected from among a group of nodes to which migration is possible based on the destination node having an appropriate amount of available (e.g., idle) resources. What constitutes an appropriate amount of available resources may be configurable. Examples include, but are not limited to, a node having the lowest current DPU utilization from among the group of nodes, a node having the lowest CPU utilization from among the group of nodes, a node having both CPU and DPU utilization values that do not exceed respective thresholds, etc. There may be any number of possible migration destination nodes, and any one may be selected using any scheme for selecting one from amongst a group.

One or more embodiments described herein allow for DPU load balancing of workloads among a group of nodes in a device ecosystem. In one or more embodiments, the trigger for the load balancing being a given node is that the DPU utilization for the node has breached a configured DPU utilization threshold. In one or more embodiments, the action taken in response to the trigger is to identify at least one workload to migrate to another node in the device ecosystem. In one or more embodiments, the workload to be migrated (i.e., a migration candidate) is selected based on having the highest CPU utilization at the time the determination is made that the DPU utilization threshold is breached, or selected based on the having the highest correlation coefficient between workload CPU utilization and node DPU utilization.

FIG. 1 shows a diagram of a system in accordance with one or more embodiments described herein. The system may include a DPU workload manager (100) operatively connected to any number of nodes (e.g., node A (102), node N (104)). Each of these components is described below.

In one or more embodiments, the nodes (102, 104) may be computing devices. In one or more embodiments, as used herein, a node (102, 104) is any computing device, collection of computing devices, portion of one or more computing devices, or any other logical grouping of computing resources. In one or more embodiments, a node (102, 104) is part of a device ecosystem, which may include any number of nodes, devices, components, etc. In one or more embodiments, a device ecosystem is a collection of devices, components, etc. arranged and/or operatively connected in any manner, and in which any number of workloads may be executed. In one or more embodiments, the device ecosystem includes a virtualization environment (not shown). In one or more embodiments, a virtualization environment is any environment in which any number of nodes are subject, at least in part, to a shared scheme pooling compute resources for use in deploying virtualized computing device instances (e.g., VMs, containers, emulators, etc.), which may be used in any arrangement to perform all or any portion of any work requested. In one or more embodiments, such virtualized computing device instances may be referred to as workloads. In one or more embodiments, such workloads may be migrated among nodes (102, 104) within the virtualization environment of the device ecosystem (e.g., pursuant to a DPU load balancing scheme, as described herein).

In one or more embodiments, as discussed above, a node (102, 104) may be a computing device, a portion of a computing device, a set of computing devices, etc. In one or more embodiments, a computing device is any device, portion of a device, or any set of devices capable of electronically processing instructions and may include, but is not limited to, any of the following: one or more processors (e.g. components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), one or more data processing units (DPUs), any number of other hardware components (not shown), and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre channel storage device, an Internet Small Computer Systems Interface (iSCSI) storage device, a tape storage device, a flash storage array, a network attached storage device, etc.), a network device (e.g., switch, router, multi-layer switch, etc.), a virtual machine, a virtualized computing environment, a logical container (e.g., for one or more applications), and/or any other type of computing device with the aforementioned requirements. In one or more embodiments, any or all of the aforementioned examples may be combined to create a system of such devices, which may collectively be referred to as a computing device or node (102, 104). Other types of computing devices may be used without departing from the scope of embodiments described herein.

In one or more embodiments, the non-volatile storage (not shown) and/or memory (not shown) of a computing device or system of computing devices may be and/or include one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums storing software and/or firmware.

Such software and/or firmware may include instructions which, when executed by the one or more processors (not shown) or other hardware (e.g. circuitry) of a computing device and/or system of computing devices, cause the one or more processors and/or other hardware components to perform operations in accordance with one or more embodiments described herein.

The software instructions may be in the form of computer readable program code to perform methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium.

In one or more embodiments, the system also includes a DPU workload manager (100). In one or more embodiments, the DPU workload manager (100) is operatively connected to the nodes (102, 104). As shown in FIG. 1, a DPU workload manager (100) may be separate from and connected to any number of nodes (102, 104). Alternatively, although not shown in FIG. 1, a DPU workload manager (100) may be part of any one or more of the nodes (102, 104) without departing from the scope of embodiments described herein. In one or more embodiments, the DPU workload manager (100) is a computing device (described above). The DPU workload manager (100), and components therein, are discussed further in the description of FIG. 2, below.

In one or more embodiments, the nodes (102, 104) and the DPU workload manager (100) are operatively connected via a network (not shown). A network may refer to an entire network or any portion thereof (e.g., a logical portion of the devices within a topology of devices). A network may include a datacenter network, a wide area network, a local area network, a wireless network, a cellular phone network, and/or any other suitable network that facilitates the exchange of information from one part of the network to another. A network may be located at a single physical location, or be distributed at any number of physical sites. In one or more embodiments, a network may be coupled with or overlap, at least in part, with the Internet.

While FIG. 1 shows a configuration of components, other configurations may be used without departing from the scope of embodiments described herein. Accordingly, embodiments disclosed herein should not be limited to the configuration of components shown in FIG. 1.

Figure 2:
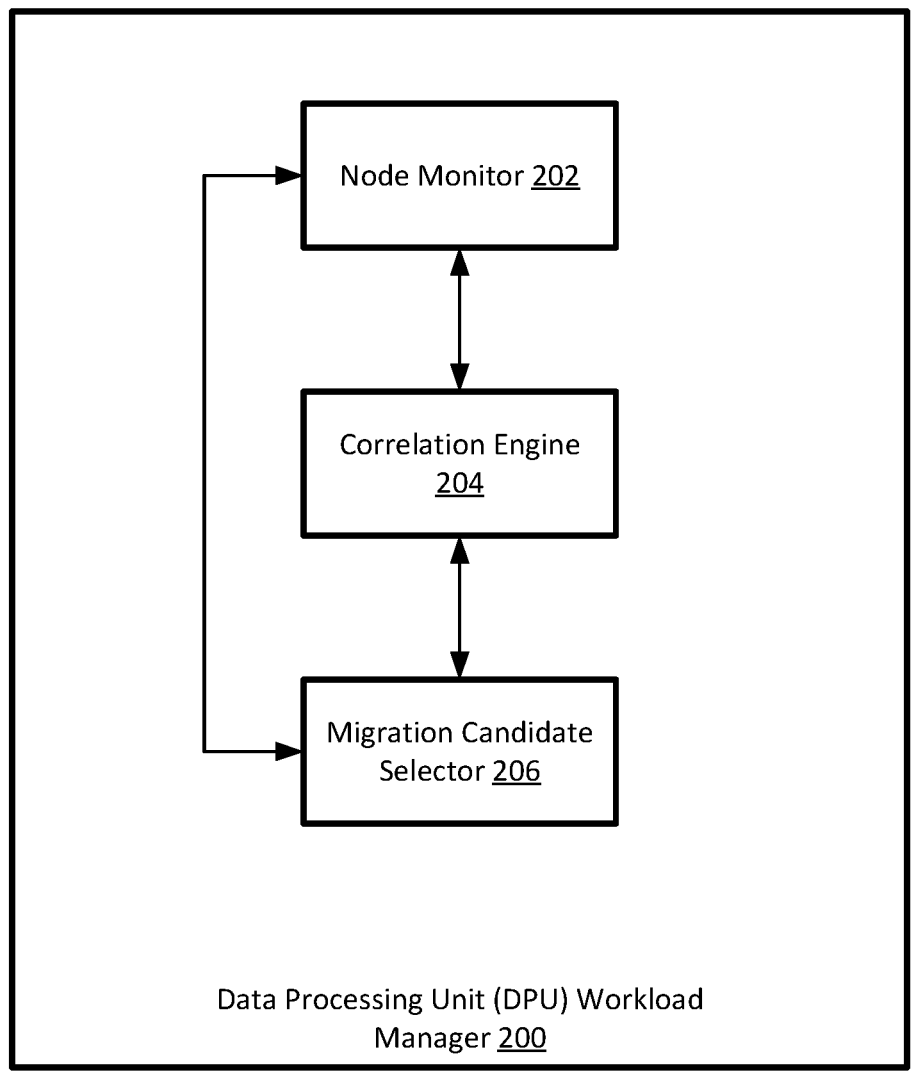
FIG. 2 shows a diagram of a data processing unit (DPU) workload manager in accordance with one or more embodiments described herein.

FIG. 2 shows a diagram of a DPU workload manager (200) in accordance with one or more embodiments described herein. The DPU workload manager (200) may include any number of components. As shown in FIG. 2, the DPU workload manager (200) includes a node monitor (202), a correlation engine (204), and a migration candidate selector (206). Each of these components is described below.

In one or more embodiments, a DPU workload manager (200) is a computing device, as discussed above in the description of FIG. 1.

In one or more embodiments, the DPU workload manager (200) includes a node monitor (202). In one or more embodiments, a node monitor (202) is any hardware (e.g., circuitry), software, firmware, or any combination thereof that includes functionality to monitor nodes of a device ecosystem, and to obtain information related to DPU utilization and CPU utilization for such nodes. DPU utilization and CPU utilization may be expressed, for example, as a percentage (e.g., (DPU resources being used/total DPU resources)*100). In one or more embodiments, the node monitor (202) includes functionality to periodically measure the DPU utilization of the nodes in order to determine whether the DPU utilization on any node has breached a DPU utilization threshold, and to ascertain a current DPU utilization of the nodes (which may be used, for example, when deciding to which node a migration candidate should be migrated). In one or more embodiments, the node monitor (202) also includes functionality to obtain the DPU utilization over time, thereby obtaining an information set of DPU utilization at a series of discrete points in time. In one or more embodiments, the node monitor (202) also includes functionality to obtain the CPU utilization for each node over time, as well as workload process information, both of which may be used to determine a CPU utilization value for each of the workloads on a given node at discrete points in time.

In one or more embodiments, the DPU workload manager (200) includes a correlation engine (204) operatively connected to the node monitor (202). In one or more embodiments, correlation engine (204) is any hardware (e.g., circuitry), software, firmware, or any combination thereof that includes functionality to receive node DPU utilization information and workload CPU utilization information from the node monitor (202), and to use the two information sets to determine correlation coefficients for the workloads on a node that represent a correlation between the CPU utilization of a workload and the DPU utilization of the node.

In one or more embodiments, the DPU workload manager (200) includes a migration candidate selector (206) operatively connected to the aforementioned node monitor (202) and correlation engine (204). In one or more embodiments, a migration candidate selector (206) is any hardware (e.g., circuitry), software, firmware, or any combination thereof that includes functionality to select a migration candidate from among the workloads executing on a given node. In one or more embodiments, the migration candidate selector (206) is configured to select a migration candidate in response to receiving a notification from the node monitor (202) that a node in a device ecosystem has breached its DPU utilization threshold. In one or more embodiments, the migration candidate selector (206) selects a migration candidate based on the current CPU utilization of the workloads of a node, with the workload having the highest CPU utilization being selected as a migration candidate. In one or more embodiments, the migration candidate selector (206) selects a migration candidate based on correlation coefficients calculated for the workloads of a node, with the workload having the highest correlation coefficient being selected as a migration candidate. In one or more embodiments, the migration candidate selector (206) includes functionality to initiate the migration of a selected migration candidate. In one or more embodiments, a migration candidate is migrated in order to reduce the DPU utilization of the node as a whole below the configured DPU utilization threshold.

While FIG. 2 shows a configuration of components, other configurations may be used without departing from the scope of embodiments described herein. For example, although FIG. 2 shows all components as part of the same device, any of the components may be grouped in sets of one or more components which may exist and execute as part of any number of separate and operatively connected devices. As another example, a single component may be configured to perform all or any portion of the functionality performed by the components shown in FIG. 2. Accordingly, embodiments disclosed herein should not be limited to the configuration of components shown in FIG. 2.

Figure 3A:
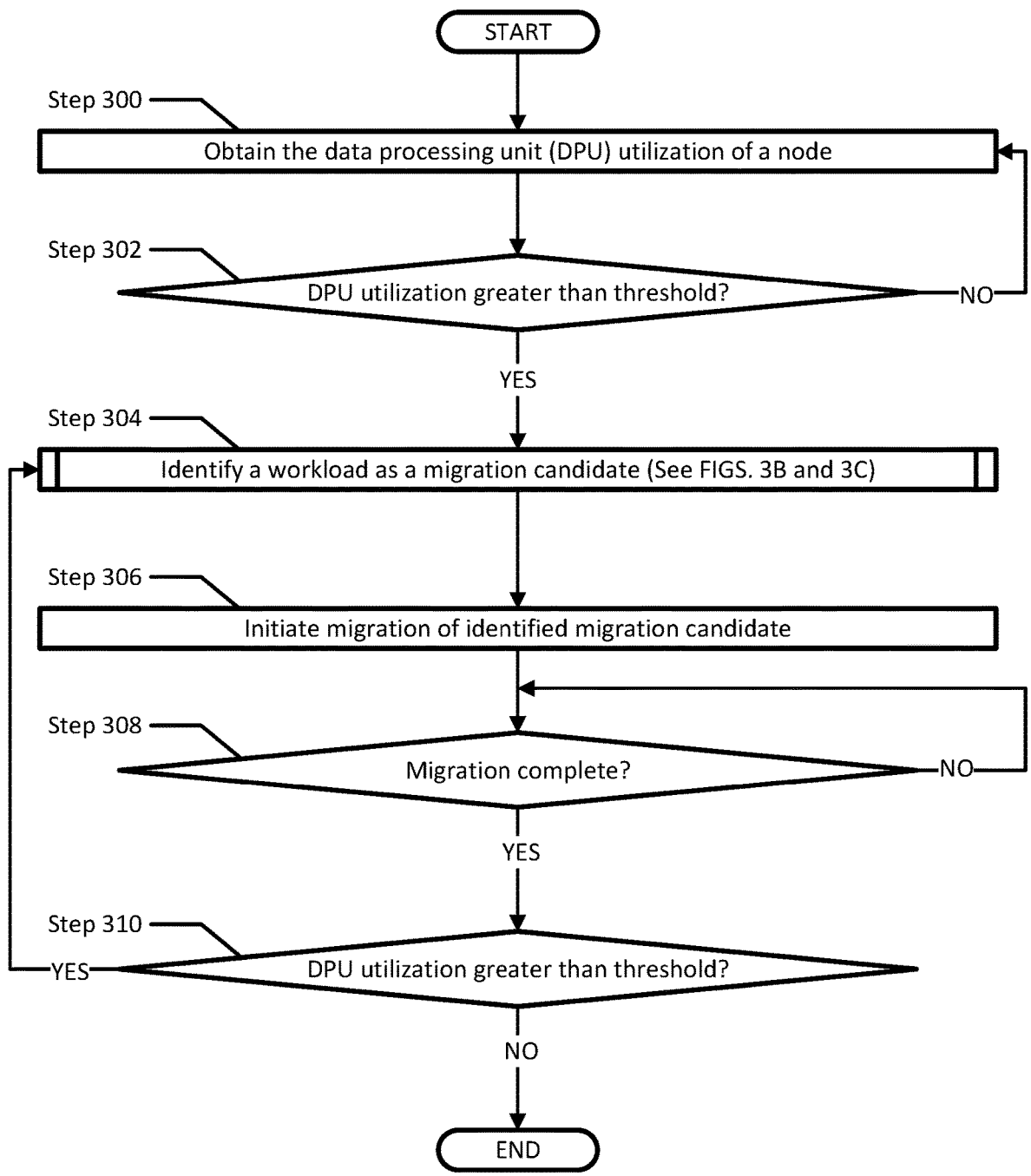
FIG. 3A shows a flowchart of a method for managing DPU workloads in accordance with one or more embodiments described herein.

FIG. 3A shows a flowchart describing a method for DPU-aware workload management in accordance with one or more embodiments disclosed herein.

While the various steps in the flowchart shown in FIG. 3A are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel with other steps of FIG. 3A.

In Step 300, the DPU utilization of a node in a device ecosystem is obtained. In one or more embodiments, the DPU utilization is a percentage of total DPU resources being used at a point in time. In one or more embodiments, the DPU utilization is obtained by a DPU workload manager that is periodically obtaining the DPU utilization of any number of nodes in a device ecosystem. As an example, a DPU workload manager may query a node for its DPU utilization in order to obtain the DPU utilization for the node.

In Step 302, a determination is made as to whether the DPU utilization value obtained in Step 300 is greater than a DPU utilization threshold. As an example, a node may be configured with a DPU utilization threshold, such as 90%, and a node having more than 90% DPU utilization is determined to have a DPU utilization above the threshold. A node may be configured with any quantity as a DPU utilization threshold without departing from the scope of embodiments described herein. Any number of nodes in a device ecosystem may be monitored for DPU utilization without departing from the scope of embodiments described herein. In one or more embodiments, if the DPU utilization for the node obtained in Step 300 is not greater than the DPU utilization threshold for the node, then the method returns to Step 300, and continues to periodically obtain DPU utilization values for the node. In one or more embodiments, if the DPU utilization obtained in Step 300 is greater than the DPU utilization threshold for the node, the method proceeds to Step 304.

In Step 304, a migration candidate is identified in response to the DPU utilization for the node being greater than the DPU utilization threshold. In one or more embodiments, the migration candidate is identified by the DPU workload manager. In one or more embodiments, the migration candidate is identified based on being the workload with the highest associated CPU utilization (See FIG. 3B). In one or more embodiments, the migration candidate is selected based on being the workload having the highest correlation coefficient representing a correlation between the CPU utilization associated with the workload and the DPU utilization of the node on which the workload is executing (See FIG. 3C).

In Step 306, a migration of a migration candidate is initiated. In one or more embodiments, the migration candidate is to be migrated to another node in the device ecosystem. Selection of another node to which a migration candidate is to be migrated may be made based on any scheme of selecting a migration destination. As an example, a node having the lowest current DPU utilization from among a group of nodes in the device ecosystem may be selected as a migration destination. As another example, a node having both a current DPU utilization and a current CPU utilization below respective utilization thresholds may be selected. Any other scheme for selecting an appropriate migration destination may be used without departing from the scope of embodiments described herein. In one or more embodiments, the migration of the migration candidate is initiated by a DPU workload manager, which may or may not additionally identify the migration destination node. The actual migration may be performed, at least in part, using any migration software capable of relocating a workload from one node to another node. As an example, if the workloads of the node are virtual machines, initiating the migration may include requesting that virtual machine management software perform the migration.

In Step 308, a determination is made as to whether the migration initiated in Step 306 is complete. In one or more embodiments, the determination is made by the DPU workload manager. In one or more embodiments, the determination is made using any scheme for determining if a workload migration is complete. As an example, if the workloads are containers, container management software may provide an indication that the migration has completed. In one or more embodiments, if the migration has not completed, the method remains at Step 308 and waits for the migration to complete. In one or more embodiments, if the migration is complete, the method proceeds to Step 310.

In Step 310, a determination is made as to whether the DPU utilization of the node is greater than the DPU utilization threshold configured for the node. In one or more embodiments, if the DPU utilization of the node remains greater than the DPU utilization threshold, the method returns to Step 304, and another migration candidate is identified. In one or more embodiments, if the DPU utilization is not greater than the DPU utilization threshold, the method ends.

Figure 3B:
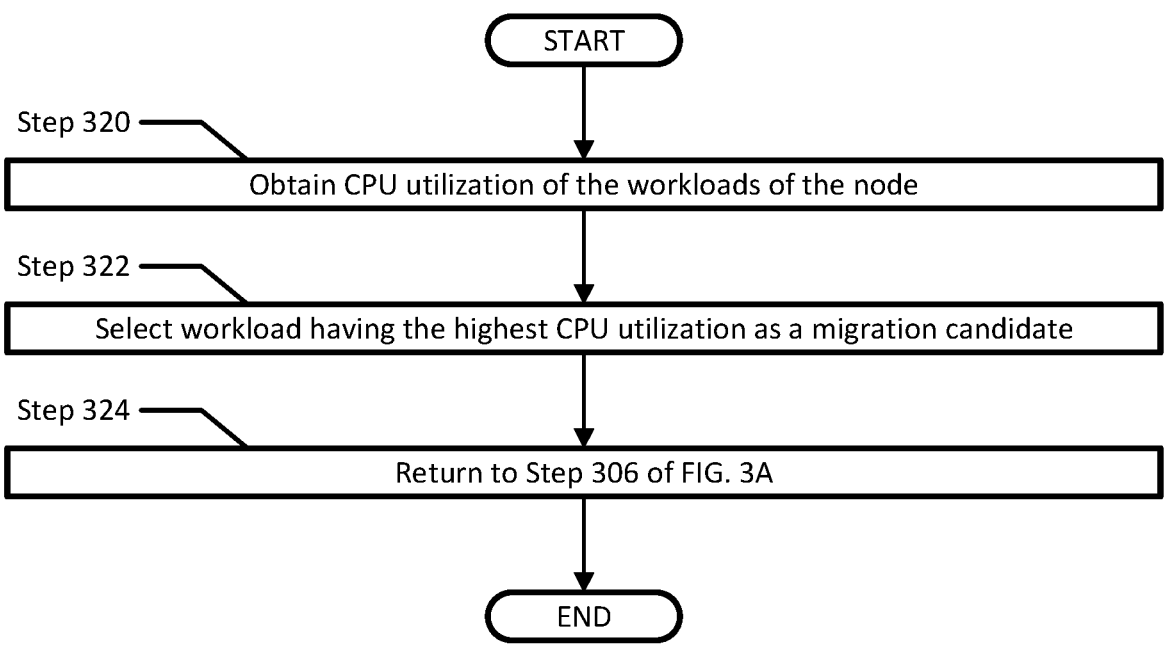
FIG. 3B shows a flowchart of a method for identifying a migration candidate in accordance with one or more embodiments described herein.

FIG. 3B shows a flowchart describing a method for identifying a migration candidate for DPU-aware workload management in accordance with one or more embodiments disclosed herein.

While the various steps in the flowchart shown in FIG. 3B are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel with other steps of FIG. 3B.

In Step 320, in response to the DPU utilization of a node being greater than a DPU utilization threshold configured for the node, information related to the CPU utilization of the node is obtained. In one or more embodiments, the CPU utilization for the node is obtained, along with workload process information that identifies the workloads for which processes are running on the CPU resources of the node. In one or more embodiments, the workload process information is used to determine the contribution of the workload to the CPU utilization of the node, which may be referred to as the CPU utilization of the workload. Additionally or alternatively, if the workload is a virtualized computing device instance (e.g., a virtual machine, a container, etc.), an operating system of the virtualized computing device instance may be queried in order to obtain the perceived CPU utilization of the virtualized computing device instance.

In Step 322, the workload having the highest CPU utilization value obtained in Step 320 is selected as a migration candidate. In one or more embodiments, the migration candidate is selected by a DPU workload manager.

In Step 324, the method returns to Step 306 of FIG. 3A for initiation of a migration of the migration candidate selected in Step 322.

Figure 3C:
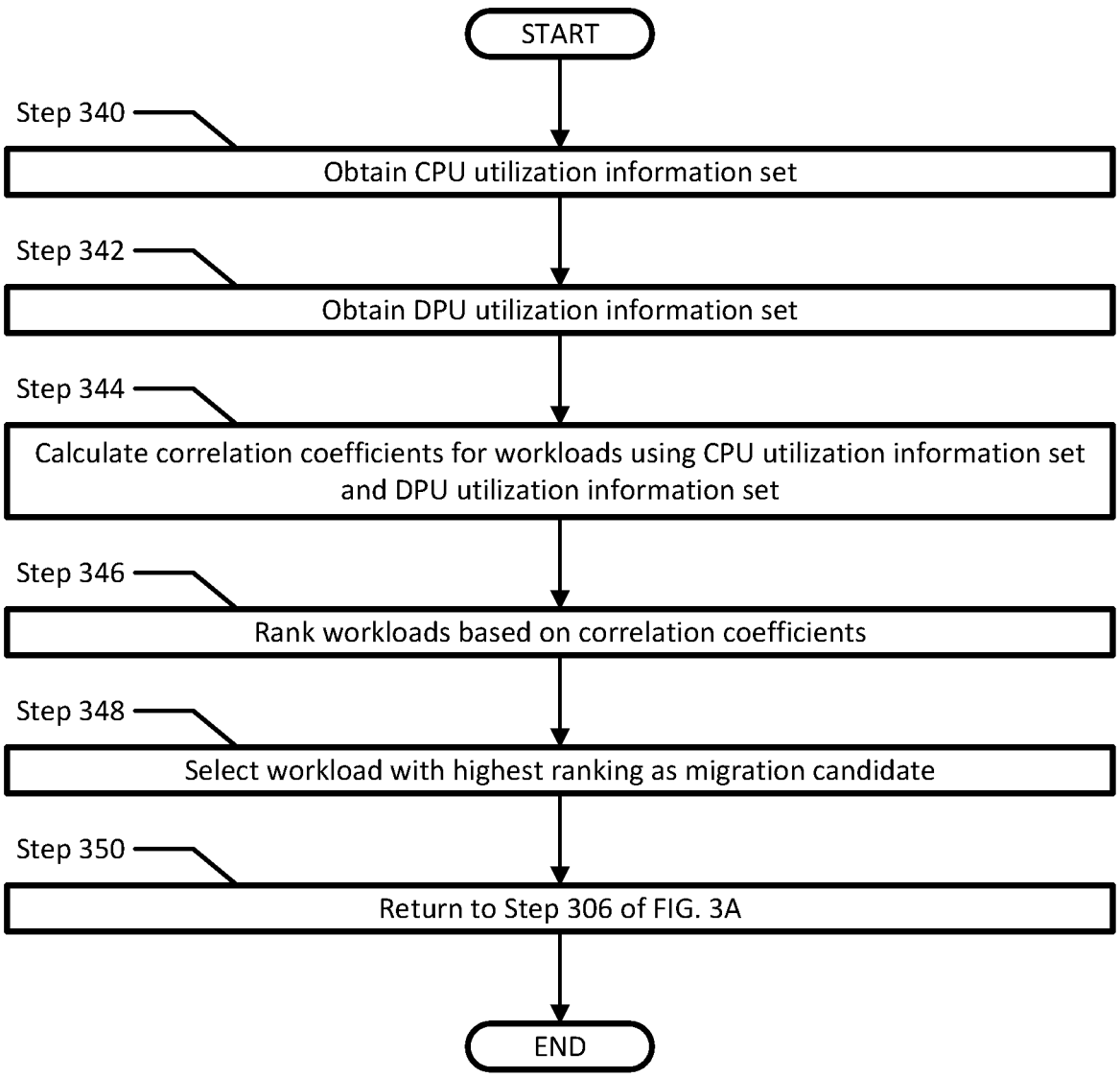
FIG. 3C shows a flowchart of a method for identifying a migration candidate in accordance with one or more embodiments described herein.

FIG. 3C shows a flowchart describing a method for identifying a migration candidate for DPU-aware workload management in accordance with one or more embodiments disclosed herein.

While the various steps in the flowchart shown in FIG. 3C are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel with other steps of FIG. 3C.

In Step 340, a CPU utilization information set is obtained. In one or more embodiments, a CPU utilization information set includes the CPU utilization of the node at discrete points in time. In one or more embodiments, the CPU utilization for the node is obtained, along with workload process information that identifies the workloads for which processes are running on the CPU resources of the node. In one or more embodiments, the workload process information is used to determine the contribution of the workload to the CPU utilization of the node, which may be referred to as the CPU utilization of the workload. In one or more embodiments, the CPU utilization information set includes any number of CPU utilization values associated with workloads paired with the times at which the CPU utilization values occurred. As an example, for a given node having five workloads, the CPU utilization information set may include ten CPU utilization values and associated times for each of the five workloads.

In Step 342, a DPU utilization information set is obtained. In one or more embodiments, a DPU utilization information set includes the overall DPU utilization of the node, or of any particular DPU therein, at discrete points in time. As an example, a resource manager of the node may be queried periodically for DPU utilization values, which are recorded along with the time at which the DPU utilization value was measured or obtained.

In Step 344, the CPU utilization information set obtained in Step 340 and the DPU utilization information set obtained in Step 342 are used to calculate correlation coefficients for the workloads executing on the node. Any scheme for calculating a correlation coefficient may be used without departing from the scope of embodiments described herein. One example of such a scheme is the calculation of a Pearson correlation coefficient using the two information sets. In one or more embodiments, a Pearson correlation coefficient is a measure of linear correlation between two sets of data. In one or more embodiments, the correlation coefficient is normalized such that it has a value between negative one and one. In one or more embodiments, a correlation coefficient is calculated for each workload executing on the node, or any portion thereof.

In Step 346, the workloads of the node are ranked based on the correlation coefficients calculated in Step 344. In one or more embodiments, the ranking ranks the workloads from highest to lowest correlation coefficient. In one or more embodiments, workloads having a higher correlation coefficient have a higher correlation between the CPU utilization of the workload and the DPU utilization of the node on which the workload executes.

In Step 348, a migration candidate is selected. In one or more embodiments, the migration candidate is selected by a DPU workload manager. In one or more embodiments, the migration candidate selected is the workload ranked the highest in the ranking created in Step 346, as having the highest correlation between workload CPU utilization and node DPU utilization.

In Step 350, the method returns to Step 306 of FIG. 3A for initiation of a migration of the migration candidate selected in Step 322.

EXAMPLE 1

The above describes systems and methods for DPU-aware workload management. Such embodiments may be used for DPU-related load balancing in device ecosystems with many nodes and even more workloads. However, for the sake of brevity and simplicity, consider the following simplified scenario to illustrate at least a portion of the concepts described herein.

Consider a scenario in which a device ecosystem includes a virtualization environment that includes five nodes, each hosting ten virtual machines (i.e., workloads). In such a scenario, the nodes are each configured with a DPU utilization threshold of 95%. The nodes are each operatively connected to a DPU workload manager. The DPU workload manager is periodically obtaining CPU utilization information sets and DPU utilization information sets from the nodes. At a certain point in time the DPU workload manager determines that node 1 has a DPU utilization value of 97%. As such, the DPU utilization value for the node is above the configured DPU utilization threshold.

In response to the determination, the DPU workload manager uses the CPU utilization information set from node 1 to determine CPU utilization values for each of the ten virtual machines executing on node 1. The DPU workload manager determines that virtual machine 7 has the highest CPU utilization value. Accordingly, virtual machine 7 is identified as a migration candidate. The DPU workload manager requests that a virtual machine manager in the device ecosystem migrate virtual machine 7. Additionally, the DPU workload manager identified node 4 as the migration destination node, and provides that identification to the virtual machine manager. The identification is based on node 4 currently having the lowest DPU utilization among the nodes of the virtualization environment.

End of Example 1

EXAMPLE 2

The above describes systems and methods for DPU-aware workload management. Such embodiments may be used for DPU-related load balancing in device ecosystems with many nodes and even more workloads. However, for the sake of brevity and simplicity, consider another simplified scenario to illustrate at least a portion of the concepts described herein.

Consider a scenario in which a device ecosystem includes a virtualization environment that includes five nodes, each hosting ten virtual machines (i.e., workloads). In such a scenario, the nodes are each configured with a DPU utilization threshold of 95%. The nodes are each operatively connected to a DPU workload manager. The DPU workload manager is periodically obtaining CPU utilization information sets and DPU utilization information sets from the nodes. At a certain point in time the DPU workload manager determines that node 1 has a DPU utilization value of 97%. As such, the DPU utilization value for the node is above the configured DPU utilization threshold.

In response to the determination, the DPU workload manager uses the CPU utilization information set and the DPU utilization set from node 1 to calculate Pearson correlation coefficients for each of the ten virtual machines executing on node 1, and ranks the virtual machines based on the correlation coefficients.

Based on having the highest ranking, representing the strongest positive Pearson correlation coefficient, the DPU workload manager identifies virtual machine 7 as a migration candidate. The DPU workload manager requests that a virtual machine manager in the device ecosystem migrate virtual machine 7. Additionally, the DPU workload manager identified node 4 as the migration destination node, and provides that identification to the virtual machine manager. The identification is based on node 4 currently having a DPU utilization value below the DPU utilization threshold for node 4, and having a CPU utilization value below a CPU utilization threshold.

End of Example 2

Figure 4:
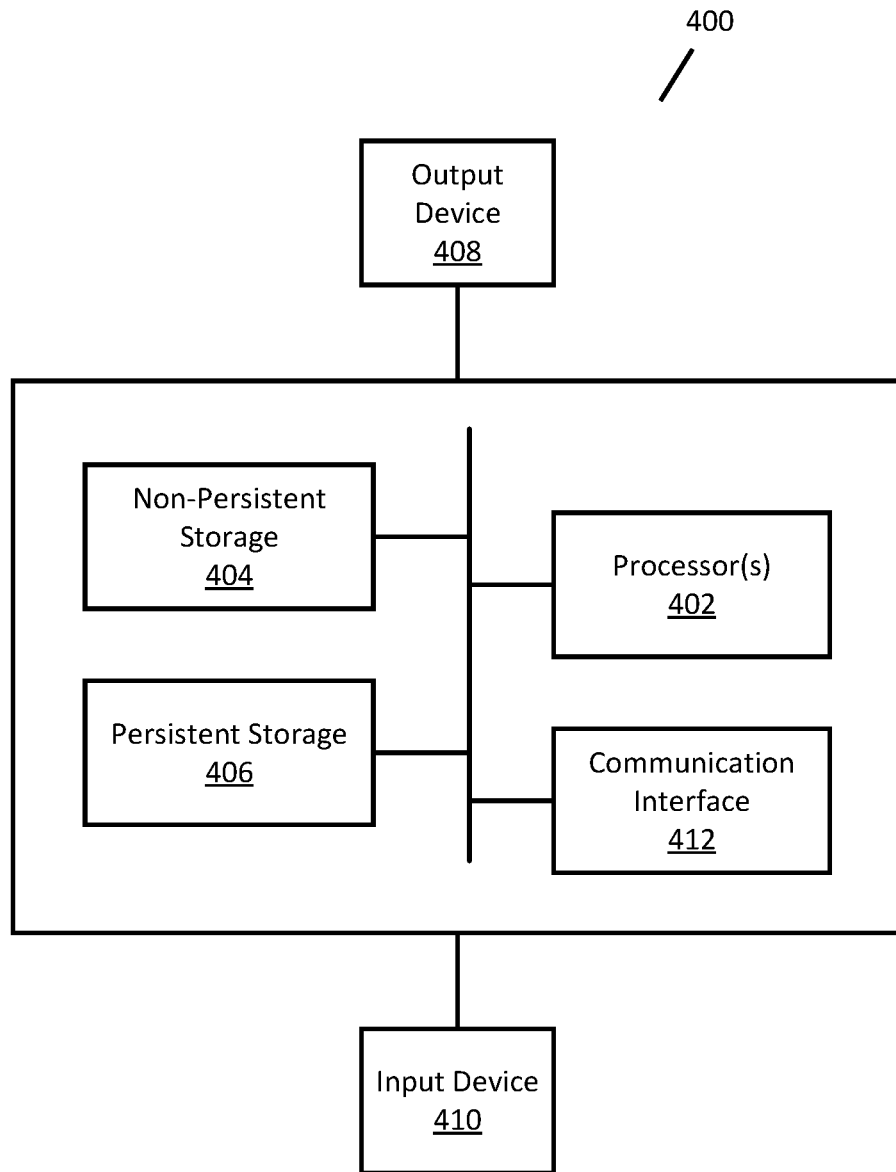
FIG. 4 shows a computing system in accordance with one or more embodiments described herein.

As discussed above, embodiments described herein may be implemented using computing devices. FIG. 4 shows a diagram of a computing device in accordance with one or more embodiments described herein. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one or more embodiments, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one or more embodiments, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406). Many different types of computing devices exist, and the aforementioned input and output device(s) may take other forms.

The problems discussed above should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for data processing unit (DPU) workload management, the method comprising:
    obtaining, by a DPU workload manager, a DPU utilization value for a first node in a device ecosystem, wherein the DPU utilization value comprises a percentage of total resources being utilized by a central processing unit (CPU), a network interface, and a logic device;
    making a first determination, by the DPU workload manager and using the DPU utilization value, that DPU utilization of the first node is above a DPU utilization threshold configured for the first node;
    identifying, in response to the first determination, a workload executing on the first node as a migration candidate, wherein:
        the workload is one of a plurality of workloads executing on the first node, and identifying the workload as the migration candidate comprises:
            obtaining a CPU utilization information set associated with the first node, wherein the CPU utilization information set includes overall CPU utilization of the first node;
            obtaining a DPU utilization information set associated with the first node, wherein the DPU utilization information set includes overall DPU utilization of the first node;
            calculating, using the CPU utilization information set and the DPU utilization information set, a plurality of correlation coefficients each corresponding to one of the plurality of workloads; and
            selecting the workload, from among the plurality of workloads, with a highest corresponding correlation coefficient;
    initiating a migration of the migration candidate to a second node in the device ecosystem, wherein the second node is a migration destination for the migration candidate based on the second node having a lowest DPU utilization value among a plurality of nodes of the device ecosystem and having appropriate resources to handle operational requirements of the migration candidate;
    obtaining, after the migration completes, a second DPU utilization value for the first node; and
    making a second determination, after the obtaining of the second DPU utilization value, that the second DPU utilization value is below the DPU utilization threshold.

2. The method of claim 1, wherein the plurality of correlation coefficients are Pearson correlation coefficients.

3. The method of claim 1, wherein when the second DPU utilization value is not below the DPU utilization threshold, the method further comprises:
    identifying a second workload executing on the first node as a second migration candidate based at least in part on a second CPU utilization value associated with the second workload; and
    initiating a second migration of the second migration candidate to a third node in the device ecosystem.

4. The method of claim 1, wherein the second node is a migration destination for the migration candidate based on the second node having a second node DPU utilization value below a second node DPU utilization threshold and having a second node CPU utilization value below a second node CPU utilization threshold.

5. A non-transitory computer readable medium comprising computer readable program code, which when executed by a computer processor enables the computer processor to perform a method for data processing unit (DPU) workload management, the method comprising:
    obtaining, by a DPU workload manager, a DPU utilization value for a first node in a device ecosystem, wherein the DPU utilization value comprises a percentage of total resources being utilized by a central processing unit (CPU), a network interface, and a logic device;
    making a first determination, by the DPU workload manager and using the DPU utilization value, that DPU utilization of the first node is above a DPU utilization threshold configured for the first node;

identifying, in response to the first determination, a workload executing on the first node as a migration candidate, wherein:

the workload is one of a plurality of workloads executing on the first node, and identifying the workload as the migration candidate comprises:

obtaining a CPU utilization information set associated with the first node, wherein the CPU utilization information set includes overall CPU utilization of the first node;

obtaining a DPU utilization information set associated with the first node, wherein the DPU utilization information set includes overall DPU utilization of the first node;

calculating, using the CPU utilization information set and the DPU utilization information set, a plurality of correlation coefficients each corresponding to one of the plurality of workloads; and selecting the workload, from among the plurality of workloads, with a highest corresponding correlation coefficient;

initiating a migration of the migration candidate to a second node in the device ecosystem, wherein the second node is a migration destination for the migration candidate based on the second node having a lowest DPU utilization value among a plurality of nodes of the device ecosystem and having appropriate resources to handle operational requirements of the migration candidate;

obtaining, after the migration completes, a second DPU utilization value for the first node; and making a second determination, after the obtaining of the second DPU utilization value, that the second DPU utilization value is below the DPU utilization threshold.

6. The non-transitory computer readable medium of claim 5, wherein the plurality of correlation coefficients are Pearson correlation coefficients.

7. The non-transitory computer readable medium of claim 5, wherein when the second DPU utilization value is not below the DPU utilization threshold, the method further comprises:

identifying a second workload executing on the first node as a second migration candidate based at least in part on a second CPU utilization value associated with the second workload; and initiating a second migration of the second migration candidate to a third node in the device ecosystem.

8. The non-transitory computer readable medium of claim 5, wherein the second node is a migration destination for the migration candidate based on the second node having a second node DPU utilization value below a second node DPU utilization threshold and having a second node CPU utilization value below a second node CPU utilization threshold.

9. A system for data processing unit (DPU) workload management, the system comprising:

a processor comprising circuitry;

memory; and a DPU workload manager operatively connected to a plurality of nodes of a device ecosystem, executing on the processor and using the memory, and configured to:

obtain a DPU utilization value for a first node of the plurality of nodes, wherein the DPU utilization value comprises a percentage of total resources being utilized by a central processing unit (CPU), a network interface, and a logic device;

make a first determination, using the DPU utilization value, that DPU utilization of the first node is above a DPU utilization threshold configured for the first node;

identify, in response to the first determination, a workload executing on the node as a migration candidate, wherein:

the workload is one of a plurality of workloads executing on the first node, and identifying the workload as the migration candidate comprises:

obtaining a CPU utilization information set associated with the first node, wherein the CPU utilization information set includes overall CPU utilization of the first node;

obtaining a DPU utilization information set associated with the first node, wherein the DPU utilization information set includes overall DPU utilization of the first node;

calculating, using the CPU utilization information set and the DPU utilization information set, a plurality of correlation coefficients each corresponding to one of the plurality of workloads; and selecting the workload, from among the plurality of workloads, with a highest corresponding correlation coefficient;

initiate a migration of the migration candidate to a second node in the device ecosystem, wherein the second node is a migration destination for the migration candidate based on the second node having a lowest DPU utilization value among a plurality of nodes of the device ecosystem and having appropriate resources to handle operational requirements of the migration candidate;

obtain, after the migration completes, a second DPU utilization value for the first node; and making a second determination, after the obtaining of the second DPU utilization value, that the second DPU utilization value is below the DPU utilization threshold.

10. The system of claim 9, wherein when the second DPU utilization value is not below the DPU utilization threshold, the DPU workload manager is further configured to:

identify a second workload executing on the first node as a second migration candidate based at least in part on a second central processing unit CPU utilization value associated with the second workload; and initiate a second migration of the second migration candidate to a third node in the device ecosystem.

11. The system of claim 9, wherein the second node is a migration destination for the migration candidate based on the second node having a second node DPU utilization value below a second node DPU utilization threshold and having a second node CPU utilization value below a second node CPU utilization threshold.

* * * * *